Feb. 28, 1961 L. E. ELFES 2,973,043
CONTROL MECHANISM FOR TRACTOR HYDRAULIC SYSTEMS
Filed Aug. 31, 1955 5 Sheets-Sheet 1

INVENTOR.
LEE E. ELFES
BY
Carlson, Pitzner, Hubbard & Wolfe
ATTORNEYS.

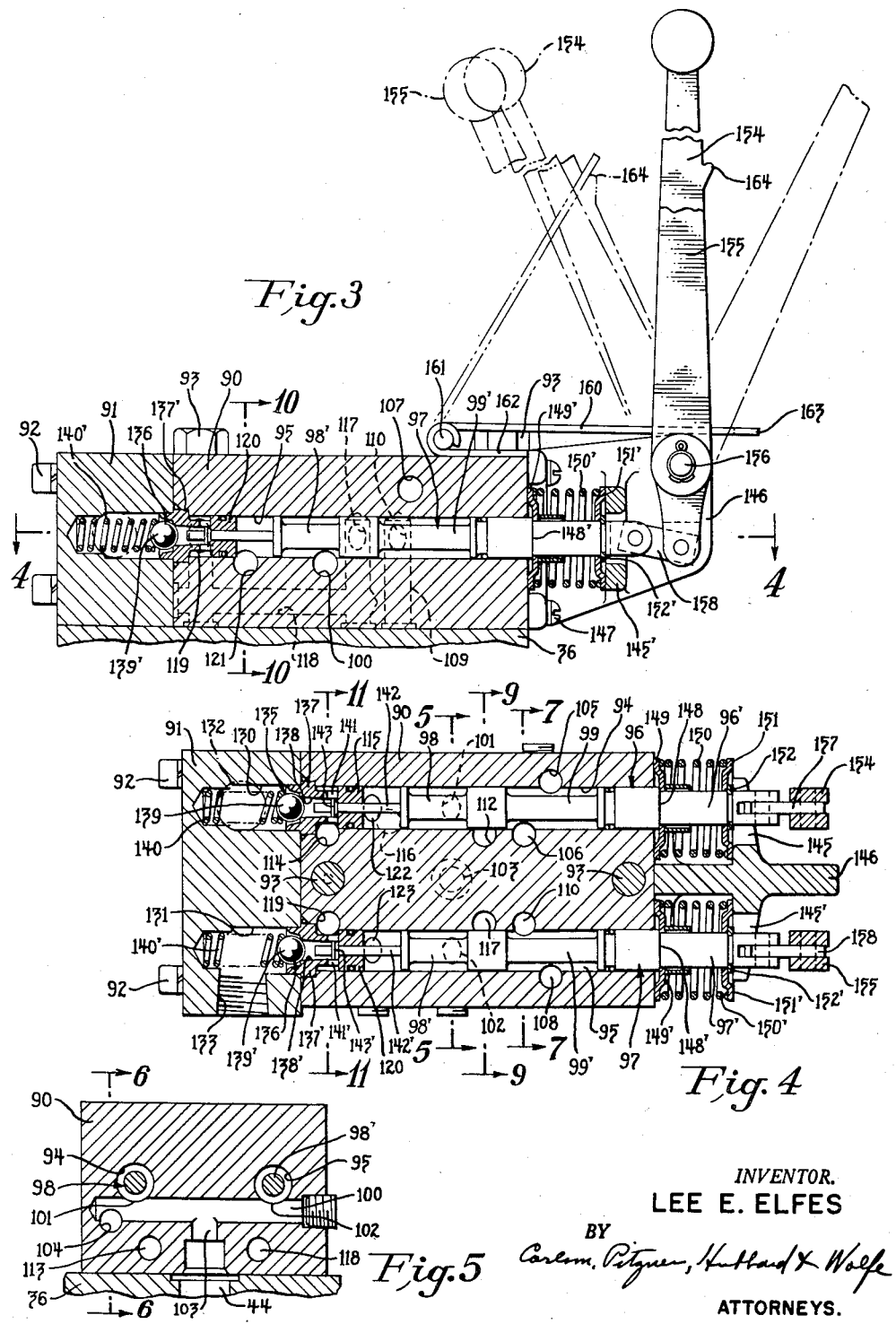

Feb. 28, 1961     L. E. ELFES     2,973,043
CONTROL MECHANISM FOR TRACTOR HYDRAULIC SYSTEMS
Filed Aug. 31, 1955     5 Sheets-Sheet 4

*INVENTOR.*
LEE E. ELFES
BY Carlson, Pitzner, Hubbard & Wolfe
ATTORNEYS.

Feb. 28, 1961 L. E. ELFES 2,973,043
CONTROL MECHANISM FOR TRACTOR HYDRAULIC SYSTEMS
Filed Aug. 31, 1955 5 Sheets-Sheet 5

INVENTOR.
LEE E. ELFES
BY
ATTORNEYS.

United States Patent Office 2,973,043
Patented Feb. 28, 1961

2,973,043
CONTROL MECHANISM FOR TRACTOR HYDRAULIC SYSTEMS

Lee E. Elfes, Birmingham, Mich., assignor to Massey-Ferguson Inc., a corporation of Maryland Filed Aug. 31, 1955, Ser. No. 531,755

5 Claims. (Cl. 172—9)

The invention relates to controls for use with draft controlled hydraulic systems of the type provided in tractors for raising and lowering a trailing implement hitch linkage and it is more particularly concerned with improved valve mechanism for supplementing the controls conventionally provided in such systems.

Basically, hydraulic systems of the above general character include an actuator for raising and lowering the hitch linkage, a pump driven from the tractor engine and supplying fluid under pressure to the actuator, and valve mechanism with associated manual and automatic controls for controlling the fluid flow to and from the actuator. The latter may be constructed and arranged to respond to the draft load on the implement to maintain it at a substantially constant working depth as determined by the setting of a hand lever. The hand lever also controls the hydraulic system for raising and lowering the hitch linkage and implement between working and transport positions. (See, for example, the system disclosed in the Ferguson Patent 2,118,180, issued May 24, 1938.)

Systems of the above type permit efficient handling of implements such as plows, harrows, etc., adapted to be coupled to the tractor hitch linkage and requiring only raising and lowering of the linkage for their proper operation. Other types of implements adapted for use with such systems include some requiring adjustments or movements in addition to those provided by the hydraulically elevatable hitch linkage. Such movements may be obtained by hydraulically operated auxiliary actuators mounted either on the implement or the tractor and coupled with the tractor hydraulic system. The association of such auxiliary actuators with the tractor hydraulic system presents difficulties due in part to the operational requirements of the draft responsive controls and other characteristics of the system.

One of the principal objects of the present invention is to provide improved auxiliary valve mechanism which materially increases the operating range and utility of tractor hydraulic systems of the above general character and which effectively supplements the conventional controls of the system by providing for positional control of the hitch linkage.

Another object is to provide auxiliary valve mechanism of the above type which affords closer and more effective coordination of the operations of the auxiliary actuator or actuators and the main actuator of the tractor hydraulic system.

A further object is to provide valve mechanism for controlling auxiliary actuators associated with a tractor hydraulic system which permits full advantage to be taken of the draft control characteristics of the system.

Still another object is to provide auxiliary valve mechanism which can be set to modify the action of the main actuator of the tractor hydraulic system or to permit normal operation by the controls conventionally provided on the tractor.

It is also an object of the invention to provide valve mechanism which is simple and rugged in construction and which can be operated associated with the tractor hydraulic system in a simple and expeditious manner without requiring changes or modifications in the hydraulic system or structural modifications of the tractor.

Other objects and advantages of the invention will become apparent from the following detailed description of the preferred embodiment illustrated in the accompanying drawings in which:

Fig. 3 is a longitudinal sectional view through the valve mechanism taken in a vertical plane substantially on the longitudinal axis of the right hand valve element.

Fig. 4 is a horizontal sectional view through the valve mechanism taken in a plane substantially on the line 4—4 of Fig. 3.

Fig. 5 is a sectional view taken in a vertical plane substantially on the line 5—5 of Fig. 4.

Figure 1:
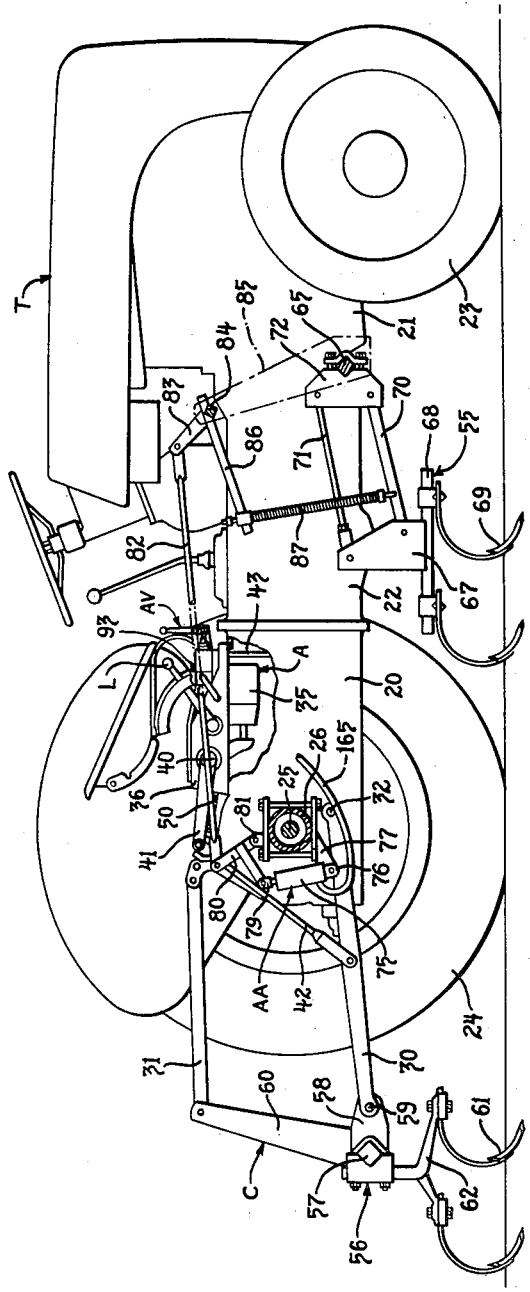
Figure 1 is a side elevational view of a tractor with a typical implement mounted thereon, the tractor being equipped with a hydraulic lift system and control mechanism embodying the features of the invention.

For purposes of illustration a single preferred embodiment of the invention and one way of associating it with the hydraulic system of a tractor has been shown and it will be described herein in some detail. It is to be understood, however, that it is not intended that the detailed character of the disclosure should limit the invention to such particulars. On the contrary, it is intended to cover all modifications and alternative constructions of the valve mechanism and the system in which it is incorporated that may fall within the spirit and scope of the invention as more broadly and generally characterized in the appended claims.

*Tractor*

For purposes of illustration the invention has been shown in association with a tractor T equipped with a mounted implement C in the form of a cultivator. The tractor will be recognized by those skilled in the art as a "Ferguson" tractor. It has a center housing 20 which, together with an engine 21 and central gear box 22 for speed change gearing (not shown), constitute the tractor body. The body is supported, in this instance, by four pneumatic tired wheels including a pair of front wheels 23 and a pair of rear wheels 24. The front wheels afford steering while the drive is through the rear wheels which are powered from the tractor engine through the change speed gearing, a differential and axle shafts 25 extending through the laterally projecting axle housings 26.

The exemplary tractor is equipped with the well-known three-point implement hitch familiar on "Ferguson" tractors, including a pair of lower or draft links 30 and an upper or top link 31. The draft links 30 converge forwardly and are trailingly pivoted as at 32 on the rear portion of the center housing to swing vertically about a transverse horizontal axis located below and slightly forward of the axle shafts 25. The pivots 32 also provide for lateral swing of the draft links.

Raising and lowering of the draft links 30 is effected through the medium of a hydraulic power unit powered from the tractor engine. While various forms of hydraulic units are available for use in tractors, that shown is constructed and designed to operate in accordance with the principles of the "Ferguson" system. (See the Ferguson Patent 2,118,180, issued May 24, 1938.) It includes a hydraulic actuator A (Fig. 2) in the form of a one-way ram comprising a cylinder 35 bolted or otherwise rigidly secured to the underside of a cover plate 36 closing the upper portion of the center housing. The cylinder opens to the rear and is equipped with a piston 37 having a piston rod 38 projecting rearwardly. The ball shaped rear end of the rod is socketed in an arm 39 rigid with a transverse rock shaft 40 journaled in the upper portion of a tractor body, in this instance, in the cover plate 36. The ends of the rock shaft project at opposite sides of the cover plate and each end has a crank arm 41 splined or otherwise rigidly fixed thereto. These crank arms are connected to the respective draft links by drop links 42.

Fluid under pressure is supplied to the cylinder 35 from a pump P (Fig. 2) driven from the tractor engine. The pump is supported within a reservoir or sump R formed in the center housing, which holds the supply of fluid such as oil for the hydraulic system. Delivery of fluid to the actuator cylinder is controlled by valve mechanism V associated with the pump inlet. From this valve mechanism, a conduit 43 leads to a port 44 in the cover plate 36. Another port 45 in the cover plate opens into the closed end of the cylinder 35. These ports are normally connected by a passage formed in a coupling element (not shown) supplied with the tractor and bolted or otherwise removably attached to the upper face of the cover plate 36.

The valve mechanism V shown is that conventionally provided in the "Ferguson" system. Briefly, it includes a plunger 46 disposed within a sleevelike liner 47 and shiftable in opposite directions from a neutral position shown in Fig. 2 in which it closes a pair of spaced ports 48 and 49 commonly known as the drop port and pump inlet port. When shifted to the left, the plunger opens the port 48 to admit fluid from the sump R to the intake of the pump P. The pump then delivers fluid under pressure to the actuator cylinder and the piston 37 is forced rearwardly to raise the draft links 30.

When the plunger 46 is moved to the right from the neutral position, port 48 remains closed while port 49 is opened to allow fluid from the actuator cylinder to discharge back to the sump R. The piston 37 moves back into the cylinder under the urging of the gravity load on the draft links and the links swing downwardly or in a lowering direction.

In the neutral position of the valve plunger, both ports 48 and 49 are closed. The pump is then shut off and fluid is locked in the actuator cylinder to hold the draft links in a fixed position. A check valve CV prevents flow of fluid back through the pump and a relief valve RV bypasses fluid from the system to the sump when the pressure in the system exceeds a predetermined value.

Control of the valve plunger 46 and thus of the raising and lowering of the draft links is effected jointly by a manually operable lever L and means responsive to the draft load on the implement coupled to the hitch linkage. This draft responsive means may be of the well-known type employed in the "Ferguson" system. It includes a shiftable control member biased by a control spring 50 (Fig. 1) to resist the thrust transmitted from the implement through the top link 31 as the ground reaction on the implement tends to rock it forwardly. The control member is operatively connected with a valve actuating lever 51 (Fig. 2) having a fulcrum at its upper end adjustable by manipulation of the hand lever L and coupled at its lower end to the valve plunger 46.

*Tractor hydraulic system*

The single main actuator A of the tractor hydraulic system provides all of the movements required for the operation of many types of implements as, for example, plows. There are, however, other types of implements that require movements or adjustments in addition to those afforded by the main actuator. Such movements may be effected conveniently by an auxiliary hydraulic actuator or actuators mounted either on the implement or on the tractor and operatively connected with the tractor hydraulic system.

Depending upon the particular type of implement involved, it may be desirable to provide for operation of the auxiliary actuator or actuators independently of the main actuator. In that case, the hydraulic connections of the main actuator are left intact and a parallel or branch connection is established for supplying the auxiliary actuator or actuators by way of auxiliary control valve mechanism.

Figure 2:
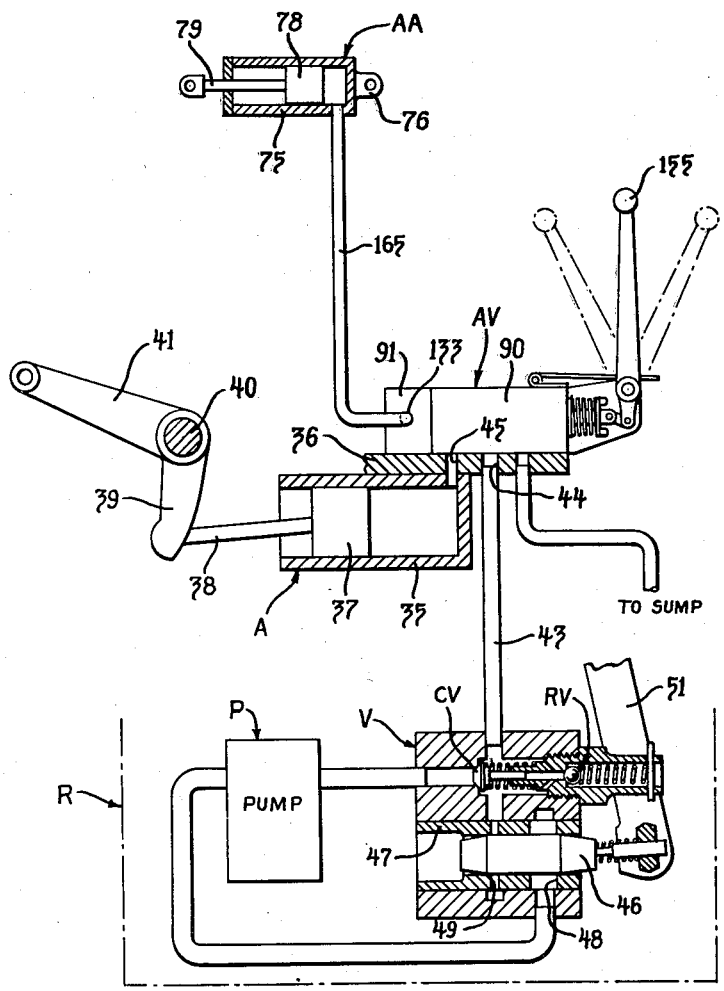
Fig. 2 is a diagrammatic view showing one way in which the auxiliary valve mechanism may be associated with the hydraulic system of the tractor shown in Figure 1.
Figure 6:
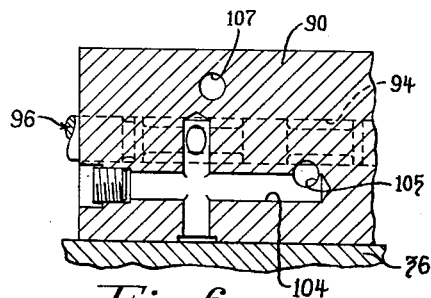
Fig. 6 is a fragmentary sectional view taken in a vertical plane substantially on the line 6—6 of Fig. 5.
Figure 7:
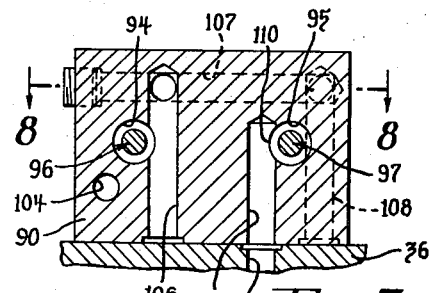
Fig. 7 is a sectional view taken in a vertical plane substantially on the line 7—7 of Fig. 4.
Figure 8:
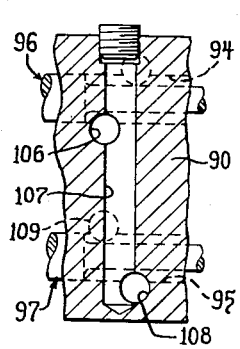
Fig. 8 is a fragmentary sectional view taken in a horizontal plane substantially on the line 8—8 of Fig. 7.
Figure 9:
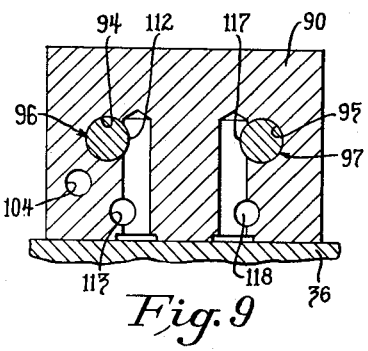
Fig. 9 is a sectional view taken in a vertical plane substantially on the line 9—9 of Fig. 4.
Figure 10:
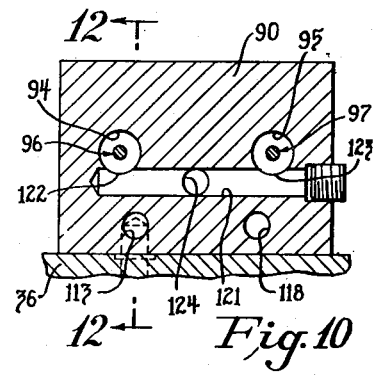
Fig. 10 is a sectional view taken in a vertical plane substantially on the line 10—10 of Fig. 3.

Alternatively, it may be desirable to coordinate the operation of an auxiliary actuator with the operation of the main actuator. In such cases, the hydraulic connections for the main actuator are also taken through the auxiliary control valve mechanism. Installation of the auxiliary valve control mechanism provided by the present invention is a simple matter in the exemplary tractor since it is only necessary to remove the coupling element normally provided on the cover plate 36 and to install in its place the auxiliary valve mechanism AV as shown in Figs. 1 and 2.

*Auxiliary actuators*

The present invention provides novel auxiliary valve mechanism particularly suited for adapting tractor hydraulic systems of the above type for the use of one or more auxiliary actuators. The auxiliary valve mechanism may be associated with the tractor hydraulic system in various ways. For example, it may be connected to provide for the control of two auxiliary actuators, leaving the main actuator subject only to the controls conventionally provided on the tractor. The auxiliary control valve mechanism may also be connected to control one or a plurality of auxiliary actuators and to provide supplemental control of the main actuator. Such supplemental control may provide for locking the main actuator in drop position or it may provide for position control of the main actuator with or without selective automatic draft control.

By way of illustration, the improved auxiliary valve mechanism AV has been shown in a form suitable for controlling one auxiliary actuator AA with either position control or selective draft control of the main actuator A. This type of control may be used to advantage with various implements and machines coupled to or operated in conjunction with the tractor. One such type of implement C has been shown in Fig. 1, by way of example.

The exemplary implement C is a cultivator C made up of two independent sections, namely, a front section 55 mounted adjacent the front portion of the tractor and a rear section 56 mounted on the tractor hitch linkage. The latter section comprises a transevrsely disposed tool bar 57 having a pair of forwardly projecting brackets 58 carrying pins 59 engaging in the usual socketed balls provided at the trailing ends of the draft links 30 to couple the section to the tractor. An upright strut 60 rigid with the tool bar connects with the top link 31 of the hitch. The tool bar 57 is adapted to carry a series of ground working tools such as the shovels 61 shown. These are adjustably mounted on the tool bar through the medium of supporting brackets 62. Raising or lowering of the rear cultivator section is effected by the main actuator A of the tractor hydraulic system operating through the hitch linkage.

The front cultivator section 55 comprises a transversely disposed tool bar 65 rigidly secured to the tractor intermediate the front and rear wheels. The tool bar carries a plurality of tool assemblies, as, for example, one at each side of the tractor. In the particular implement shown, each tool assembly comprises an upright frame member 67 rigid with an auxiliary tool bar 68 supporting a plurality of ground working tools such as shovels 69. The tool assembly is mounted for vertical movement by parallel links 70 and 71 pivotally connected respectively to the frame member 67 and to a bracket 72 adjustably clamped to the tool bar 65.

To provide for raising and lowering the front implement section 55 independently of the rear section 56, the auxiliary actuator AA is provided. The particular actuator illustrated is a one-way ram comprising a cylinder 75 (Figs. 1 and 2) having a lug 76 adjacent its closed end by which it is pivotally anchored to a mounting bracket 77 rigidly clamped on one of the tractor axle housings 26. The cylinder is fitted with a piston 78 having a piston rod 79 operatively connected with one arm of a T-shaped lever 80 which has another arm pivoted as at 81 on the bracket 77. The third arm of the lever 80 is connected by a thrust link 82 with a crank arm 83 fast on a shaft 84 extending transversely across the tractor and journaled in brackets 85 carried by the tool bar 65.

Arms 86 rigid with the shaft 84 and located above the respective tool assemblies are connected with the support bars 70 by spring loaded tension links 87. These links are so arranged that rocking movements of the shaft 84 are effective to raise or lower the tool assemblies. Furthermore, the tool assemblies are permitted to move upwardly against the force of the loading springs in case the tool assemblies encounter soil areas too hard to penetrate.

It will be evident that with the above arrangement the admission of pressure fluid to the closed end of the cylinder 75 will force the piston 78 upward to rock the shaft 84 in a clockwise direction and thus raise the tool assemblies to idle position. Conversely, when fluid is permitted to exhaust from the cylinder 75 the tool assemblies will descend, forcing the piston 78 into the cylinder.

*Auxiliary control valve mechanism*

The auxiliary control valve mechanism AV in the form shown herein is constructed to provide two independently operable directional valves, each having associated with it a combined check and metering valve. In its preferred form, the valve mechanism comprises a housing made up of a main section 90 and an end section 91 rigidly secured together as by screws 92 (Figs. 3 and 4). The housing is adapted to be secured flush against the cover plate 36 of the tractor in place of the usual coupling element or block as by screws 93 (Figs. 1 and 3).

Referring more particularly to Figs. 3–12 of the drawings, the housing section 90 is formed with a pair of parallel cylindrical valve bores 94 and 95 opening at opposite ends of the section. The bores are respectively fitted with movable valve members or spools 96 and 97. The spools in this instance are alike, each having two axially spaced portions 98, 98' and 99, 99' of reduced diameter with lands at opposite ends of such portions dimentioned for a sealing fit with the walls of the valve bore. The valve spools are shiftable endwise to open or close various ports for directing the flow of pressure fluid to and from the actuators with which the valve mechanism is associated, as will appear presently.

The housing section 90 is preferably in the form of a rectangular metal block and the ports and passages, as well as the valve bores 94 and 95, are laid out so that they can be formed by conventional drilling operations. In the case of internal passages the bores are closed by screw threaded plugs. A precision valve structure can thus be produced at relatively low cost.

The particular valve selected to illustrate the invention is especially suitable for and is shown installed in a tractor hydraulic system to control delivery of pressure fluid to and exhaust of pressure fluid from the main ram cylinder 35 and the auxiliary actuator cylinder 75. To this end pressure fluid is delivered to the valve bores 94 and 95 by way of a passage 100 (Figs. 5, 13 and 14) in the housing section extending transversely thereof to intersect the valve bores at pressure inlet ports 101 and 102. A branch 103 from the center of the passage 100 opens through the bottom face of the housing section to register with the port 44 in the cover plate 36 to which the pressure supply conduit 43 is connected, as heretofore explained. Another branch 104 (Figs. 5 and 6) from the passage 100 extends parallel to the bore 94 and opens into it through a port 105 spaced farther along the bore (as viewed in Figs. 13 and 14).

Opening into the bore 94 between the ports 101 and 105 is an exhaust port 106 (Figs. 4, 7 and 8) connected by a passage 107 with a port 108 opening into the bore 95 substantially in transverse alinement with port 105. A passage 109 opens into the bore 95 through a port 110 located in lateral alinement with the port 106. Passage 109 also opens through the bottom face of the housing section to register with an exhaust port 111 in the cover plate 36 through which fluid is returned to the sump R.

Intermediate the ports 101 and 106 the bore 94 has a port 112 (Figs. 4 and 12) connected by a passage 113 with a port 114 opening into a chamber formed in the left end of the valve bore by a plug 115 seated therein. In the particular valve illustrated the passage 113 has a branch 116 opening through the bottom wall of the housing section 90 for registration with the port 45 in communication with the closed end of the main ram cylinder 35. Similarly, a port 117 (Figs. 9, 13 and 14) in the bore 95 alined with the port 112 is connected by a passage 118 with a port 119 opening into a chamber formed at the left end of that bore by a plug 120.

Figure 11:
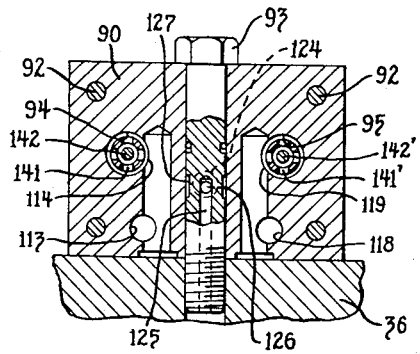
Fig. 11 is a sectional view taken in a vertical plane substantially on the line 11—11 of Fig. 4.
Figure 12:
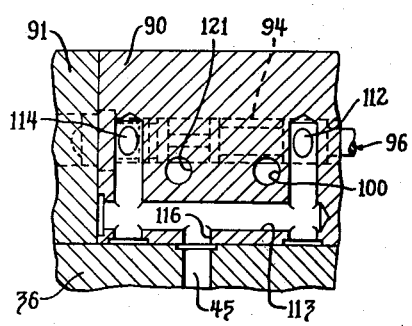
Fig. 12 is a fragmentary sectional view taken in a vertical plane substantially on the line 12—12 of Fig. 10.

Additionally, the bores 94 and 95 are connected by a passage 121 opening through ports 122 and 123 to the respective bores. Any fluid collecting in this portion of the valve bore drains back to the reservoir or sump through the passage 121 and a branch passage 124 which opens into the hole provided for one of the bolts 93. As shown in Fig. 11, this bolt is formed with an axial drain passage 125 connected by a lateral passage or passages 126 with a peripheral groove 127 in the bolt which is adapted to register with the branch passage 124.

The housing end section 91 of the valve mechanism is formed to coact with the section 90 in completing the valve structure. More particularly, the end section is formed with closed end bores 130 and 131 (Figs. 4, 13 and 14) positioned to register respectively with the bores 94 and 95. Threaded outlet ports 132 and 133 opening through the side faces of the block provide for connecting the respective valves with auxiliary actuators or other devices to be controlled.

Interposed between the valve bores 94 and 95 and the outlet ports are check valves 135 and 136 normally effective to prevent fluid flow into the valve bores while permitting flow in the opposite direction. These check valves are adapted to be opened for flow in either direction in response to predetermined shifting of the associated valve spools. The check valves are constructed and arranged in a manner which simplifies manufacture, facilitates assembly and, in addition, to serve as metering valves providing variable control of fluid flow when the valve is opened, as will be described presently.

As shown in Figs. 3 and 4, the check valves 135 and 136 are alike, comprising bushings 137, 137' dimensioned at one of their ends to fit tightly into the bores 130 and 131. The bushings have peripheral flanges or shoulders adapted to seat in counter bores formed at the ends of the bores 94 and 95. The arrangement is such that leakage around the bushings is precluded.

Central passages 138, 138' through the bushings are flared at their outer ends and formed with seats for movable valve members or balls 139, 139'. Springs 140, 140' urge the balls against their seats to maintain the valves closed against the fluid flow into the bores 94, 95. Fluid flow in the opposite direction is permitted by the yielding of the springs under the pressure exerted by the fluid on the balls.

Figure 13:
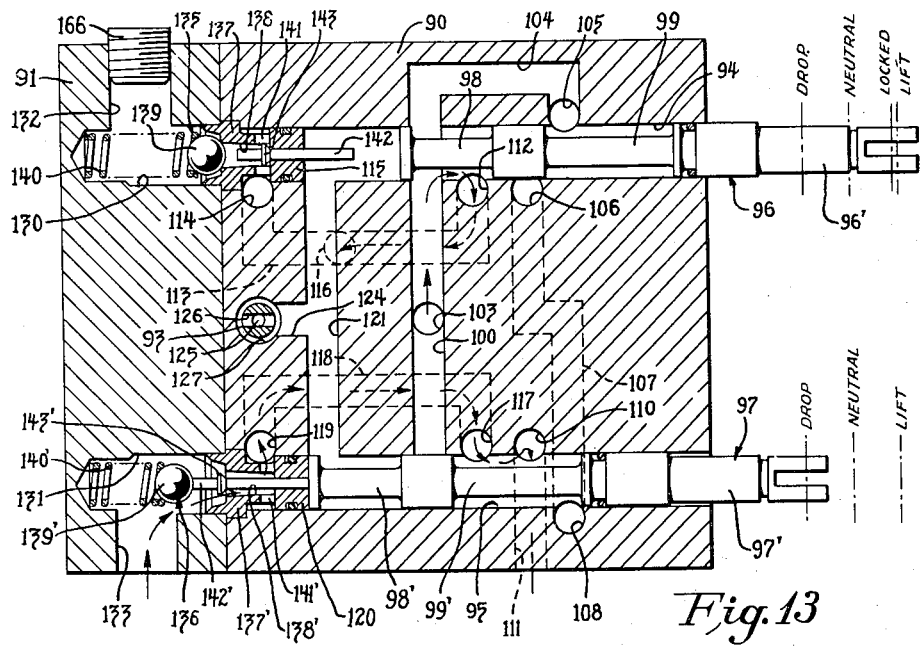
Figs. 13 and 14 are views generally similar to Fig. 4 on a somewhat larger scale and showing diagrammatically fluid paths established in different adjusted positions of the valve mechanisms.
Figure 14:
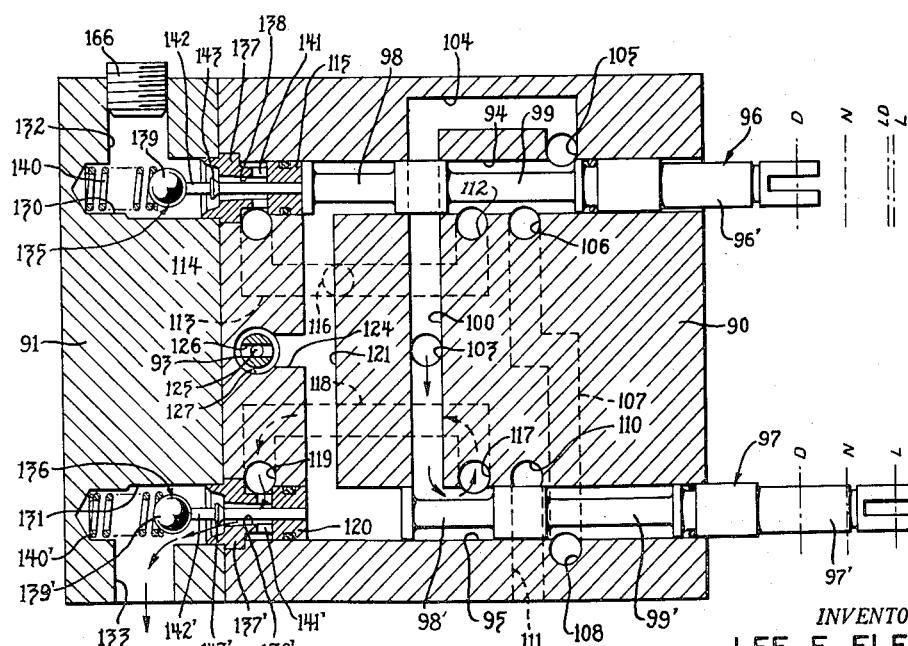

At their inner ends the bushings 137, 137' are adapted to abut the plugs 115 and 120 and the ends of the bushings are slotted as at 141, 141' to afford communication between the passages 138, 138' and the end chambers of the valve bores 94, 95. To provide for unseating the ball elements 139, 139' to open the check valves, the plugs 115 and 120 are apertured to slidably receive plungers 142, 142' engageable by the adjacent ends of the valve spools 96, 97 when the spools are shifted to the left from the neutral position toward the advanced position in which the spool 97 is shown in Fig. 13.

It will be observed that the passages 138 and 138' are tapered and that the plungers 142, 142' are formed with enlarged heads 143, 143' for cooperation with the walls of the passages. The arrangement is such that the plungers are effective to variably restrict the flow of fluid through the passages in accordance with their positions within the passages. Accordingly, the discharge rates of the auxiliary actuators associated with the valve mechanism may be variably controlled by appropriate shifting of the associated valve spools.

Provision is made in the exemplary valve mechanism for biasing the valve spools 96 and 97 to a central or neutral position (shown in Fig. 4) and for shifting them manually in either direction to operative positions which may be characterized respectively as "drop" and "lift" positions. For this purpose, the spools are formed with extensions 96', 97' (Fig. 4) dimensioned to project beyond the ends of the valve bores 94, 95 and between spaced laterally projecting fingers 145, 145' formed on a bracket 146 suitably attached to the end of the housing section 90 as by screws 147. The extensions 96', 97' are of reduced diameter, thus defining shoulders 148, 148' for seating thrust the washers 149, 149'. Compression springs 150, 150' interposed between the washers 149, 149' and opposed washers 151, 151' urge the latter against the locking rings 152, 152' engaged in grooves in the respective spool extensions.

The fingers 145, 145' are spaced from the end of the housing section so that the washers when urged to their limit positions abut the end of the housing section and the fingers and thereby locate the plungers 96, 97 in neutral position. Upon displacement of the spools from the neutral position the springs 150, 150' are compressed from one end or the other to store energy for restoring the spools to neutral position.

Shifting of the valve spools 96, 97 is effected independently by a pair of hand levers 154, 155, each pivoted intermediate its ends on a cross pin 156 carried by the bracket 146. The lever 154 is connected by a pivoted link 157 with the spool 96 and the hand lever 155 is similarly connected by a link 158 with the spool 97. The arrangement is such that the levers are substantially upright when the associated spools are in neutral position. Forward swinging of the levers toward the "drop" position shifts the spool rearwardly to open check valves 135, 136 and permits exhaust of fluid from the actuators controlled by such valves. Rearward swinging of the levers shifts the valve spools forwardly to direct the flow of pressure fluid to the actuators and thus initiate a lifting action.

To permit an actuator to be temporarily freed from control by the auxiliary valve mechanism, provision is made for latching one or both of the levers 154, 155 in an operated position. While the latch mechanism may be constructed and arranged to hold either lever in either of its two operated positions, by way of example mechanism has been shown for latching the lever 154 in the "lift" position. The mechanism as shown comprises an elongated latch finger 160 hinged as at 161 at one end to a plate 162 adapted to be anchored to the housing section 90 by one of the screws 93. The latch finger is arranged to project forwardly beyond the pivot of the hand levers and is formed at its free end with a laterally projecting hook 163 adapted to hook over the lever 154 when swung upwardly to the locking position in which it is shown in broken lines in Fig. 3. A projection 164 on the hand lever serves to retain the latch element in raised position. Preferably the projection is rounded so that the latch element may be quickly and easily disengaged by a downward push. As will be seen by reference to Fig. 3, the top of the bracket 146 will serve as a limit stop to position the latch element in the release position shown in full lines.

*Résumé of operation*

Having in mind the construction of the auxiliary valve mechanism and its incorporation in a tractor hydraulic system above described, the operation of the modified system will be readily understood. Briefly, the exemplary system includes one auxiliary actuator AA which is connected to the outlet port 133 by a conduit 165. The other outlet port is closed by a screw plug 166. It will be understood, of course, that if a second auxiliary actuator is required it will be connected to the valve mechanism by way of the port 132.

When the valve housing is bolted to the tractor cover plate 36 in place of the usual coupling block, the valve mechanism is connected to the pressure supply conduit of the tractor hydraulic system by way of the port 44. The main actuator A of the tractor hydraulic system is also connected to the valve mechanism by way of the port 45.

With both valve spools 96 and 97 in neutral position, delivery of fluid under pressure by the pump P is started by swinging the quadrant lever L (Fig. 1) toward the "lift" position. Operation of the quadrant lever acts in well-known manner to shift the valve plunger 46 (Fig. 2) to the left to open the pump intake port 48. Drop port 49 is closed by the plunger. On opening of the intake port, the pump P delivers fluid under pressure through the main valve mechanism V, conduit 43 and port 44 to the auxiliary control valve mechanism where it follows the passages 103, 100, 104 through port 105 into the valve bore 94. As the reduced portion 99 of the valve spool is located in register with the ports 105 and 106 the fluid then passes by way of the latter port passage 107, port 108, valve bore 95 and port 110 through which it is returned to the sump R. Thus, fluid is circulated in the system at relatively low pressure and without operation of either of the actuators.

When it is desired to raise the rear implement section 56 the hand lever 154 is pulled back, shifting the valve spool 96 forwardly to the "lift" position as shown in Fig. 13. The valve spool opens the port 112 and closes exhaust port 106. Diversion of fluid to the sump is thus terminated and fluid under pressure is directed by way of passage 113 and 116 and port 45 to the closed end of the main actuator cylinder 35. The main actuator accordingly operates to raise the hitch linkage and the implement or implement section attached thereto.

Since the raising action of the main actuator may be interrupted at any time by simply returning the valve spool 96 to neutral position, the auxiliary valve mechanism affords complete and accurate positional control of the main actuator. It thus modifies the action of the tractor hydraulic system in a manner which substantially broadens its range of operation.

To lower the hitch linkage the hand lever 154 is swung forwardly to the "drop" position. The valve spool 96 is accordingly shifted rearwardly to close the pressure inlet port 101 and to open the port 112 so that fluid may exhaust from the actuator by way of the port 106 and the path previously described.

If it is desired to operate the implement attached to the hitch linkage under normal draft control, the hand lever 154 is swung back and latched in "lift" position (Fig. 3) by the latch element 160. The valve spool 96 is thus positioned to direct pressure fluid to the main actuator A by way of the port 112 and exhaust port 106 is closed. The delivery of pressure fluid to and exhaust of fluid from the main actuator is thus placed under sole control of the main control valve V whose plunger 46 is shifted in well-known manner in response to changes in the draft load on the hitch linkage or by manipulation of the quadrant lever L. Accordingly, it will be evident that the valve auxiliary mechanism may be set to permit conventional operation of the tractor without requiring disconnection of the auxiliary actuator or of the controls associated with it.

The auxiliary actuator AA may be controlled in a similar manner by manipulation of the hand lever 155. Thus, when the lever is pulled back, pressure fluid received in the bore 95 through the port 103 is directed through port 117, passage 118 and port 119 to the chamber at the left end of the valve bore. Here the fluid passes through the slots 141' in the bushing 137' and forces the ball element 140' from its seat. Fluid thus passes through the check valve and outlet port 133 and conduit 165 to the auxiliary actuator cylinder 75 to initiate a lifting action of the auxiliary actuator.

Upon return of the valve spool 97 to neutral position, fluid remains locked in the auxiliary actuator cylinder through the action of the check valve 136. Accordingly, the associated actuator may be operated in any desired manner without interfering with or releasing the auxiliary actuator.

To initiate a lowering action of the auxiliary actuator, the hand lever 155 is swung forwardly to the "drop" position. The valve spool 97 is thus shifted rearwardly and, through the plunger 142', forces the ball element 140' from its seat to permit fluid to exhaust from the cylinder 75. Such fluid is returned to the sump by way of the passage 138', port 119, passage 118 and ports 117 and 110.

The rate of lowering of the auxiliary actuator can be regulated by the extent to which the plunger 142' is displaced which determines the location of the head 143' in the passage 138'. The farther back the head is shifted in the passage, the larger the opening defined with the walls of the passage and consequently the faster the drop.

The arrangement whereby both actuators controlled by the auxiliary valve mechanism exhaust through the port 110 provides a useful interlock which insures operation of the actuators in proper sequence. More particularly, movement of the hand lever 155 to lift position acts to close the port 110 so that the actuator controlled by the companion valve mechanism cannot be lowered even though the lever 155 is swung to "drop" position. This is particularly advantageous when operating sectional implements such as that shown in Fig. 1, where operation might result in damage to the tools of the implement.

In general, it will be evident from the foregoing that the invention provides a novel auxiliary valve mechanism which materially broadens the operating range of the tractor hydraulic system of the type equipped for automatic draft control. Implements such as the two-section cultivators shown in Fig. 1 can be operated with maximum efficiency and under full control of the operator at all times. Thus, both cultivators can be held at a selected depth of cultivation relative to the tractor by dropping them to the desired position and then returning the control levers to neutral position. Furthermore, the cultivators can be raised or lowered at will by their respective control levers. This is important, for example, at the beginning of a row in that the front cultivator can be lowered to working position as soon as it reaches the ground to be cultivated and thereafter the rear cultivator can be lowered to working position when that section comes upon the cultivated ground. At the end of the row the front cultivator can be raised first and the rear cultivator later in reverse sequence so that no damage is done to the headlands and yet the end portions of the row are properly cultivated.

The operator of the tractor not only has full positional control of both actuators but, when desired, can place the rear cultivator section under automatic draft control. He may then focus his attention simply on the front cultivator insofar as depth of cultivation is concerned. In addition, other types of implement may be operated by the hitch linkage without requiring removal of the front cultivator sections and automatic draft control is available at all times.

It will also be evident that the latch mechanism may be arranged to hold the lever 154 in the drop position if desired. This provides for advantageous operation of implements such as side-delivery rakes which are required to follow ground contour. For example, in such implements fluid must be free to discharge from the main actuator as the implement passes over depressions in the ground. Accordingly, with the hand lever located in drop position, the implement may freely follow ground contour without any effort on the part of the tractor operator.

I claim as my invention:

1. In a tractor having a vertically swingable implement hitch and a main hydraulic actuator for raising and lowering the hitch, a source of fluid under pressure, and draft responsive means including main valve means controlling the delivery of fluid from the source to the actuator and the exhaust of fluid from the actuator, an auxiliary actuator, valve means including a pair of independently operable valves, each connected to the fluid source, one of said valves having a connection with the main actuator and the other having a connection with the auxiliary actuator, manually operable means for actuating said one valve to supply pressure fluid to or exhaust pressure fluid from the main actuator to raise or lower the hitch, manually operable means for actuating the other valve to supply pressure fluid to or exhaust pressure fluid from the auxiliary actuator, and connections between said valves preventing exhaust of fluid from the main actuator when that valve is actuated to supply fluid to the auxiliary actuator.

2. For use with a tractor having a vertically swingable implement hitch, a main hydraulic actuator for raising and lowering the hitch, valve means controlling the supply of pressure fluid to and exhaust of fluid from the actuator, a hand lever operable to actuate said valve means to effect the raising and lowering of the hitch between working and transport positions, and draft responsive means operable with the hitch in working position to actuate said valve means to maintain a uniform draft load on the hitch at a value determined by the setting of the hand lever, auxiliary valve means interposed between the actuator and said valve means, said auxiliary valve means including a shiftable member operable in one position to divert fluid from said valve means to exhaust and in another position to direct the fluid from said valve means to the actuator, and means for releasably latching said auxiliary valve means in said other position.

3. For use with a tractor having a vertically swingable implement hitch, a hydraulic actuator for raising and lowering the hitch, valve means controlling the supply of pressure fluid to and exhaust of fluid from the actuator, a pivoted hand lever for actuating said valve means to raise the linkage to transport position or lower it to working position, and means responsive to the draft load on the implement attached to said linkage for actuating the valve means to raise or lower the linkage so as to maintain the draft load at a substantially constant value as determined by the setting of said hand lever, auxiliary valve means adapted to be mounted on the tractor, and connections between the valve means, the actuator and said auxiliary valve means by which said auxiliary valve means is rendered operative to control said actuator so as to locate and retain the hitch linkage in any selected position below the transport position, said auxiliary valve means being further operative to direct the fluid from the actuator to exhaust independently of said valve means to condition the linkage for free movement by the forces acting on the implement.

4. The combination in a tractor having a vertically swingable implement hitch linkage, a main hydraulic actuator for raising and lowering the linkage, valve means controlling the operation of the actuator, means operable in response to the draft load on the implement attached to the linkage for actuating said valve means to maintain the draft load substantially constant, of an auxiliary actuator, auxiliary valve means having ports and passages adapted to be connected to the valve means, the main hydraulic actuator and the auxiliary actuator, a first valve member movable relative to certain of said ports to control the supply of fluid to and exhaust of fluid from the main actuator, and a second valve member movable relative to other of said ports to control the supply of pressure fluid to and exhaust of fluid from said auxiliary actuator.

5. The combination in a tractor having a hydraulic system including a main actuator, a pump for delivering fluid through a supply conduit to the main actuator, and a main valve means controlling delivering of fluid from the pump to and exhaust of fluid from the main actuator, of auxiliary valve means connected in the supply conduit, said auxiliary valve means including a valve member shiftable between a neutral position and either of two operated positions, and ports controlled by said valve member operable to divert fluid from the supply conduit to exhaust when said valve member is in neutral position, to direct fluid from the supply conduit to the main actuator when said valve member is shifted to one operated position, and to direct fluid from the main actuator to exhaust when the valve member is in its other operated position.

References Cited in the file of this patent

UNITED STATES PATENTS

| | | |
|---|---|---|
| Re. 24,006 | Acton | May 24, 1955 |
| 2,118,180 | Ferguson | May 24, 1938 |
| 2,309,158 | Benjamin | Jan. 26, 1943 |
| 2,645,866 | McGee | July 21, 1953 |
| 2,672,802 | Bunting | Mar. 23, 1954 |
| 2,698,632 | Margrave | Jan. 4, 1955 |
| 2,717,002 | Lucien | Sept. 6, 1955 |
| 2,722,804 | Stickney | Nov. 8, 1955 |
| 2,722,873 | Garmager | Nov. 8, 1955 |